US009733473B2

(12) United States Patent
Kasuga

(10) Patent No.: US 9,733,473 B2
(45) Date of Patent: Aug. 15, 2017

(54) CAMERA MODULE COMPRISING LENS, IMAGE PICKUP ELEMENT

(71) Applicant: Sharp Kabushiki Kaisha, Sakai, Osaka (JP)

(72) Inventor: Kyoji Kasuga, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/393,364

(22) Filed: Dec. 29, 2016

(65) Prior Publication Data

US 2017/0108695 A1   Apr. 20, 2017

Related U.S. Application Data

(63) Continuation of application No. 14/632,393, filed on Feb. 26, 2015, now Pat. No. 9,547,153, which is a continuation of application No. 13/556,773, filed on Jul. 24, 2012, now Pat. No. 9,046,678.

(30) Foreign Application Priority Data

Jul. 29, 2011   (JP) ................................. 2011-167730

(51) Int. Cl.
*H04N 5/225* (2006.01)
*G02B 27/00* (2006.01)
*G02B 7/09* (2006.01)

(52) U.S. Cl.
CPC ........... *G02B 27/0006* (2013.01); *G02B 7/09* (2013.01); *H04N 5/2252* (2013.01); *H04N 5/2253* (2013.01); *H04N 5/2254* (2013.01)

(58) Field of Classification Search
None
See application file for complete search history.

(56) References Cited

U.S. PATENT DOCUMENTS

| 7,881,598 B1 | 2/2011 | Wu et al. |
| 2002/0005997 A1 | 1/2002 | Oba |
| 2004/0207745 A1 | 10/2004 | Tsuruta et al. |
| 2005/0129384 A1 | 6/2005 | Nishida et al. |
| 2005/0168846 A1 | 8/2005 | Ye et al. |
| 2006/0181632 A1 | 8/2006 | Makii et al. |
| 2006/0181748 A1 | 8/2006 | Makii et al. |
| 2006/0219885 A1 | 10/2006 | Kinoshita et al. |
| 2006/0221225 A1 | 10/2006 | Tsukamoto et al. |
| 2006/0244113 A1 | 11/2006 | Saimun et al. |
| 2008/0265350 A1 | 10/2008 | Wu et al. |

(Continued)

FOREIGN PATENT DOCUMENTS

| JP | 2005-175971 A | 6/2005 |
| JP | 2006-227102 A | 8/2006 |

(Continued)

OTHER PUBLICATIONS

Office Action for U.S. Appl. No. 13/556,773 (Sep. 30, 2013).

(Continued)

*Primary Examiner* — Twyler Haskins
*Assistant Examiner* — Dwight C Tejano
(74) *Attorney, Agent, or Firm* — Mintz Levin Cohn Ferris Glovsky and Popeo, P.C.; David G. Conlin; Steven M. Jensen

(57) ABSTRACT

In a camera module (51), a lid glass (15) protrudes from a sensor cover (14) toward an image pickup lens (1), and a base section (9) includes an overhanging part (9b) overhanging in such a manner as to cover part of the lid glass (15).

6 Claims, 6 Drawing Sheets

(56) References Cited

U.S. PATENT DOCUMENTS

| | | |
|---|---|---|
| 2010/0033608 A1 | 2/2010 | Chul |
| 2010/0033616 A1 | 2/2010 | Huang et al. |
| 2010/0110270 A1 | 5/2010 | Sekimoto et al. |
| 2010/0208132 A1 | 8/2010 | Shiraishi |
| 2012/0104524 A1 | 5/2012 | Takeshita et al. |
| 2012/0154614 A1 | 6/2012 | Moriya et al. |
| 2014/0072825 A1 | 3/2014 | Tober |

FOREIGN PATENT DOCUMENTS

| | | |
|---|---|---|
| JP | 2010-004349 A | 1/2010 |
| JP | 2010-041213 A | 2/2010 |
| JP | 2010-134409 A | 6/2010 |
| JP | 2010-193059 A | 9/2010 |
| JP | 2011-065140 A | 3/2011 |
| JP | 2012-027063 A | 2/2012 |

OTHER PUBLICATIONS

Office Action for U.S. Appl. No. 13/556,773 (Jan. 29, 2014).
Office Action for U.S. Appl. No. 13/556,773 (Apr. 11, 2014).
Office Action for U.S. Appl. No. 13/556,773 (May 22, 2014).
Office Action for U.S. Appl. No. 13/556,773 (Dec. 18, 2014).
Office Action for U.S. Appl. No. 14/632,393 (May 20, 2016).

CAMERA MODULE COMPRISING LENS, IMAGE PICKUP ELEMENT

This application is a continuation of U.S. Ser. No. 14/632,393 filed on Feb. 26, 2015, being issued as U.S. Pat. No. 9,547,153 on Jan. 17, 2017, which is a continuation of U.S. Ser. No. 13/556,773, filed on Jul. 24, 2012, now U.S. Pat. No. 9,046,678 with an issue date of Jun. 2, 2015, which claims priority under 35 U.S.C. §119(a) to Japanese Patent Application No. 2011-167730 filed on Jul. 29, 2011, the entire contents of which are hereby incorporated by reference.

TECHNICAL FIELD

The present invention relates to camera modules that are mounted in electronic devices having a function of taking images or video pictures.

BACKGROUND ART

Recently, as a camera module that is mounted in an electronic device such as a cellular phone, Patent Literature 1 proposed a camera module including an optical structure capable of adjusting the focal position of a lens; and an element substrate on which a solid-state image pickup element has been mounted in correspondence with the lens, an intermediate structure being provided which is placed between the optical structure and the element substrate, at least either the optical structure or the intermediate structure including a locking part for locking the other structure.

The camera module of Patent Literature 1 has a window part formed in a position in the intermediate structure which corresponds to the solid-state image pickup element, with an optical filter attached to a side of the window part which faces the solid-state image pickup element.

Further, Patent Literature 2 proposes a camera module including: an optical section having an image pickup lens and a lens barrel holding the image pickup lens; a lens driving section which drives the image pickup lens from the end at infinity to the macro end along an optical axis, and an image pickup section having an image pickup element which converts light having entered through the image pickup lens into an electrical signal, the lens driving section including (i) a movable section which has the optical section held inside thereof and which is capable of moving along the optical axis and (ii) a fixed section which does not change its position while the image pickup lens being driven, when the lens driving section drives the image pickup lens toward the end at infinity, a reference plane of the optical section and a reference plane of the lens driving section or a reference plane of the image pickup section as formed on the fixed section coming into contact with each other.

In the camera module of Patent Literature 2, the image pickup section includes a sensor cover which covers at least part of the image pickup element and on a surface of which the lens driving section is mounted. The sensor cover is provided with an opening for securing an optical path, with a glass substrate placed in the opening.

CITATION LIST

Patent Literature 1
Japanese Patent Application Publication, Tokukai, No. 2005-175971 (Publication Date: Jun. 30, 2005)

Patent Literature 2
Japanese Patent Application Publication, Tokukai, No. 2010-134409 (Publication Date: Jun. 17, 2010)

SUMMARY OF INVENTION

Technical Problem

It should be noted here that if foreign bodies generated in the step of assembling the camera module and foreign bodies having got inside the camera module fall onto the optical filter of the camera module of Patent Literature 1 or the glass substrate of the camera module of Patent Literature 2, such foreign bodies may block light from reaching the image pickup element. The technology of Patent Literature 1 takes no thought for this problem.

Meanwhile, Patent Literature 2 teaches that the glass substrate has its upper surface protruding from the sensor cover toward (a higher position than) the image pickup lens, and that the camera module is made more resistant to foreign bodies by placing the glass substrate at a longer distance from the image pickup element. However, such placement of the glass substrate would put limitations on the shapes, arrangement, etc. of the other structures of the camera module, thus making it impossible to provide a high-quality camera module.

The present invention has been made in view of the foregoing problems, and it is an object of the present invention to provide a high-quality camera module with limited influence of foreign bodies having got inside it.

Solution to Problem

In order to solve the foregoing problems, a camera module according to the present invention includes: a lens; an image pickup element; a housing section which has an opening facing the lens and which houses the image pickup element; a translucent member, fixed on the housing section, which closes the opening; a movable section which holds the lens; and a fixed section, fixed in a different position on the housing section from the translucent member, which drives the movable section, the translucent member protruding from the housing section toward the lens, the fixed section having an overhanging part overhanging in such a manner as to cover part of the translucent member.

According to the foregoing configuration, the translucent member protrudes from the housing section toward the lens. With this, the image pickup element can be kept at a distance from foreign bodies, if any, having got fallen onto the translucent member. Therefore, the influence on light reaching the image pickup element can be reduced with respect to the size of foreign bodies, so that the influence of foreign bodies can be curbed.

Further, foreign bodies are forced to follow a complex path by falling onto the surface of the housing section first and then moving onto the translucent member. Since the translucent member protrudes from the housing section and, furthermore, part of the translucent member is covered by the overhanging part, the path is complexified. This makes it possible to suitably prevent the foreign bodies from falling onto the translucent member. Therefore, the influence of the foreign bodies can be curbed.

Further, according to the foregoing configuration, the fixed section is fixed in a different position on the housing section from the translucent member. The translucent member can be successfully made to protrude from the housing section toward the lens.

Further, according to the foregoing configuration, at least part of the driving mechanism for driving the movable section can be provided on the overhanging part. This makes it possible to place the driving mechanism closer to the optical axis even if the protrusion of the translucent member from the housing section toward the lens causes the fixing position of the fixed section to be shifted outward with respect to the optical axis. Therefore, as for the shapes, arrangement, etc. of the structures of the camera module, it is possible to achieve a configuration at the same level as or a higher level than that which is obtained in a case where the translucent member does protrude from the housing section toward the lens. Further, since the housing section is more depressed than the translucent member, it is also possible to secure space for the driving mechanism and increase driving thrust as needed.

As described above, the foregoing configuration makes it possible to provide a high-quality camera module with limited influence of foreign bodies having got inside it.

Advantageous Effects of Invention

A camera module according to the present invention includes: a lens; an image pickup element; a housing section which has an opening facing the lens and which houses the image pickup element; a translucent member, fixed on the housing section, which closes the opening; a movable section which holds the lens; and a fixed section, fixed in a different position on the housing section from the translucent member, which drives the movable section, the translucent member protruding from the housing section toward the lens, the fixed section having an overhanging part overhanging in such a manner as to cover part of the translucent member. This makes it possible to curb the influence of foreign bodies having got inside, and to achieve harmony between the structures.

DESCRIPTION OF EMBODIMENTS

First Embodiment

Figure 1:
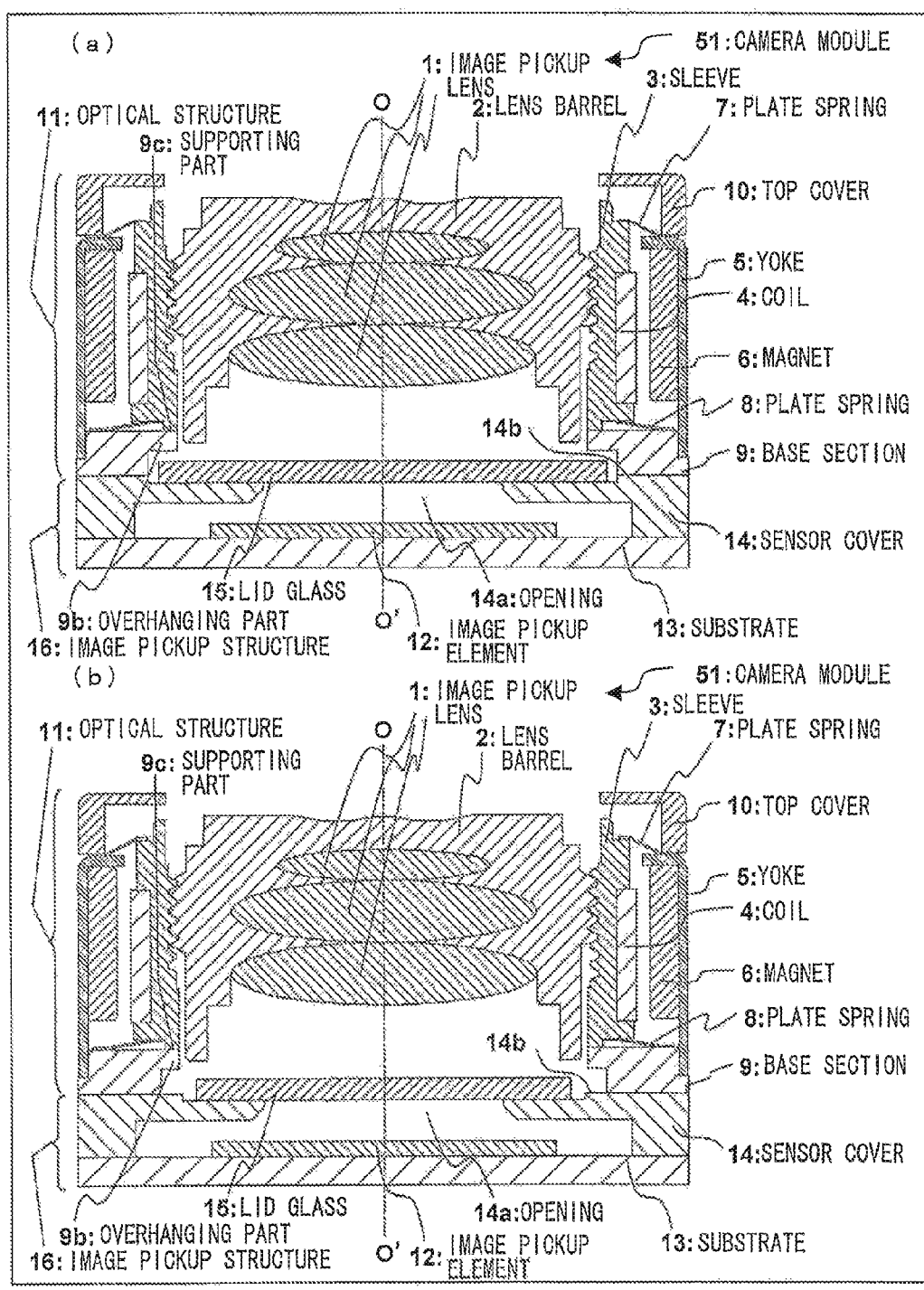
FIG. 1 is a set of cross-sectional views schematically showing a configuration of a camera module according to an embodiment of the present invention.

FIG. 1 is a set of cross-sectional views (a) and (b) schematically showing a configuration of a camera module 51 according to an embodiment (first embodiment) of the present invention. (a) of FIG. 1 is a cross-sectional view of the camera module 51 as taken along a diagonal line across a lid glass 15 to be described later (along the line A-A' of FIGS. 4 and 5), and (b) of FIG. 1 is a cross-sectional view of the camera module 51 as taken along a central line parallel to a side of the lid glass 15 (along the line B-B' of FIGS. 4 and 5). As shown in FIG. 1, the camera module 51 is composed of an optical structure 11 and an image pickup structure 16 joined on top of each other.

(Optical Structure)

In the present embodiment, the optical structure 11 includes an image pickup lens (lens) 1, a lens barrel 2, a sleeve 3, a coil 4, a yoke 5, a magnet 6, plate springs 7 and 8, a base section 9, and a top cover 10.

The base section 9, fixed to the image pickup structure 16, supports the other components of the optical structure 11. The yoke 5, provided as an outer part of the optical structure 11 and fixed to the base section 9, has its upper part covered with the top cover 10.

Placed in a part surrounded by the yoke 5 is the sleeve 3, inside of which the lens barrel 2 is fixed. The lens barrel 2 holds the image pickup lens 1. In FIG. 1, the image pickup lens 1 has its optical axis represented by O-O'. The optical axis of the image pickup lens 1 is hereinafter referred to simply as "optical axis".

The plate spring 7 has one end fixed to an upper part of the sleeve 3, with the other end of the plate spring 7 being fixed to the yoke 5. The plate spring 8 has one end fixed to a lower part of the sleeve 3, with the other end of the plate spring 8 being fixed to the base section 9. That is, the sleeve 3 is connected to the base section 9 and the yoke 5 via the plate springs 7 and 8 so as to be able to move along the optical axis as the plate springs 7 and 8 deform.

Further, the coil 4 is wound around the sleeve 3. Further, the magnet 6 is provided on the inner side of the yoke 5 in such a manner as to face the coil 4. The sleeve 3 can be driven along the optical axis by supplying an electric current to the coil 4. That is, the camera module 51 allows the image pickup lens 1 to be driven along the optical axis, thereby achieving an autofocus function, for example.

In the present embodiment, those components of the optical structure 11 which are designed to be driven along the optical axis, i.e., the image pickup lens 1, the lens barrel 2, the sleeve 3, and the coil 4 are referred to as "movable section 21", and those components of the optical structure 11 which are fixed to the image pickup structure 16 to drive the movable section 21, i.e., the base section 9, the yoke 5, the magnet 6, the top cover 10, and the plate spring 7 and 8 are referred to as "fixed section 22".

(Image Pickup Structure)

In the present embodiment, the image pickup structure 16 includes an image pickup element 12, a substrate 13, a sensor cover (housing section) 14, and a lid glass (translucent member) 15.

The image pickup element 12 is provided on the substrate 13. Further, the sensor cover 14, fixed on the substrate 13, houses the image pickup element 12. The sensor cover 14 is provided with an opening 14a through which light having entered through the image pickup lens 1 passes. Moreover, the lid glass 15 is fixed on the sensor cover 14 in such a manner as to close the opening 14a. Further, the sensor cover 14 has a mounting surface 14b as an upper surface thereof. The mounting surface 14b is a region different from the region in which the lid glass 15 is fixed. The base section 9 (or rather, a lower surface 9b of the base section 9) of the optical structure 11 is fixed on the mounting surface 14b.

Figure 3:
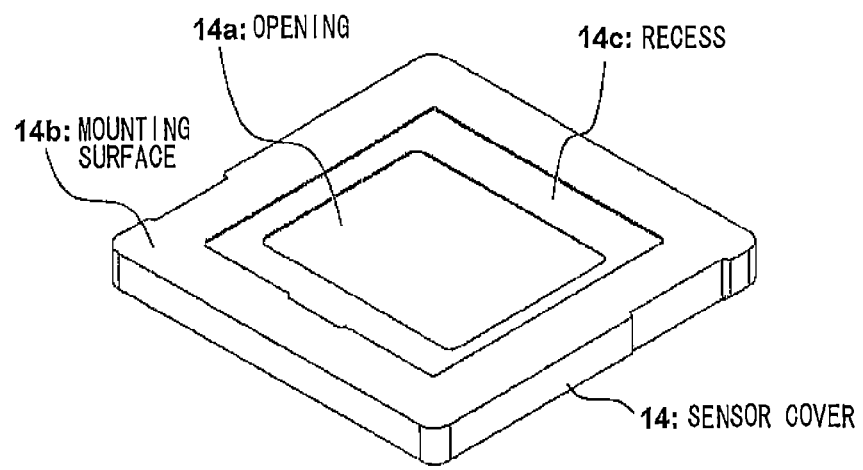
FIG. 3 is a perspective view schematically showing a structure of a housing section according to an embodiment of the present invention.

FIG. 3 is a perspective view schematically showing a structure of the sensor cover 14. As shown in FIG. 3, the sensor cover has its opening 14a provided in a central part thereof. Further, the sensor cover 14 has its mounting surface 14b provided on its outer perimeter. Moreover, the sensor cover 14 has a recess 14c so provided between the opening 14a and the mounting surface 14b as to surround the opening 14a. The recess 14c is a region for fixing the lid glass 15, and is lower than the mounting surface 14b toward the image pickup element 12.

Figure 4:
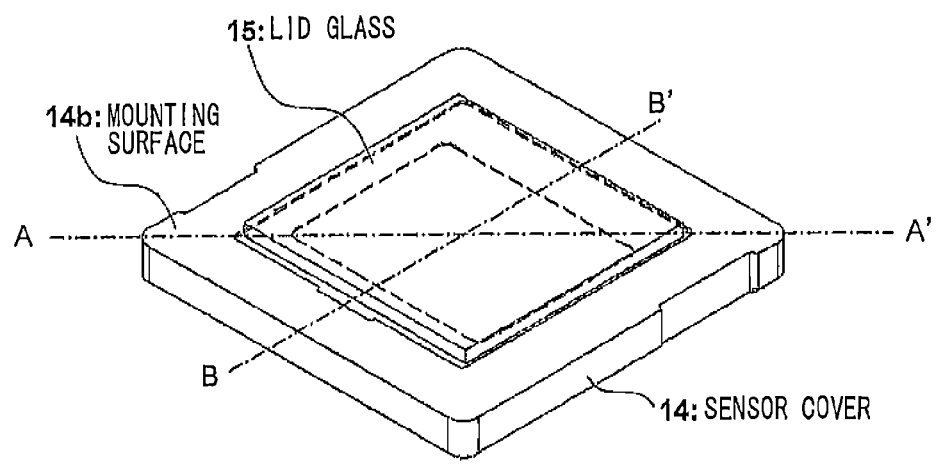
FIG. 4 is a perspective view schematically showing a structure of a housing section according to an embodiment of the present invention on which a translucent member has been fixed.

FIG. 4 is a perspective view schematically showing a structure of the sensor cover 14 on which the lid glass 15 has been fixed. As shown in FIG. 4, the lid glass 15, which has a rectangular shape, is fixedly fitted in the recess 14c. That is, the width of the recess 14c is greater than the size of the lid glass 15. Further, the depth of the recess 14c is less than the thickness of the lid glass 15 so that the lid glass 15 protrudes from the sensor cover 14 toward the image pickup lens 1.

In other words, with it being assumed that the direction from the image pickup element 12 to the image pickup lens 1 is an upward direction, the lid glass 15 has its upper surface in a higher position than the upper surface (mounting surface 14b) of the sensor cover 14.

With such a configuration, the image pickup element 12 can be kept at a distance from foreign bodies, if any, having got inside the camera module 51 and fallen onto the lid glass 51. Therefore, the influence on light reaching the image pickup element 12 can be reduced with respect to the size of foreign bodies, so that the influence of foreign bodies can be curbed. That is, the configuration makes it possible to increase the permissible size of foreign bodies on the lid glass 15, thus making it possible to provide a higher-quality camera module.

Further, foreign bodies having got inside the camera module 51 are forced to follow a complex path by falling onto the upper surface of the sensor cover 14 first and then moving onto the lid glass 15. Furthermore, since the lid glass 15 protrudes from the sensor cover 14 toward the image pickup lens 1, there exists a barrier between the upper surface of the sensor cover 15 and the lid glass 15. Such a path can suitably prevent the foreign bodies from falling onto the translucent member. Therefore, the influence of the foreign bodies can be curbed.

Further, since the sensor cover 14 has its mounting surface 14b more depressed than the lid glass 15 (with it being assumed that the direction from the image pickup element 12 toward the image pickup lens 1 is an upward direction, the mounting surface 14b of the sensor cover 14 is in a lower position than the upper surface of the lid glass 15), it is also possible to secure space for a driving mechanism and increase driving thrust as needed. That is, this makes it possible to allow for greater height of the optical structure 11 to the extent that the mounting surface 14b of the sensor cover 14 is made lower than the upper surface of the lid glass 15, thus making it possible to allow for greater sizes of the magnet 6 and the coil 4, which are disposed around the lens barrel 2. This allows for a margin of driving thrust for the sleeve 3, thus making it possible to provide a higher-quality camera module.

Further, since, as a region for fixing the lid glass 15 on the sensor cover 14, the recess 14, which is wider than the size of the lid glass 15 and shallower than the thickness of the lid glass 15, is provided, the lid glass 15 can be successfully made to protrude from the sensor cover 14 toward the image pickup lens 1 while being fixed on the sensor cover 14.

It should be noted that the lid glass 15 needs only protrude from the sensor cover 14 toward the image pickup lens 1, and does not always need to be fixed in the recess 14c as shown in FIG. 4. The lid glass 15 may be fixed on the sensor cover 14 in such a manner as to be in a region at the same level as the mounting surface 14b or at a higher level than the mounting surface 14b toward the image pickup lens 1.

Further, since the base section 9 (or rather, the lower surface 9b of the base section 9) of the optical structure 11 is fixed on a position (mounting surface 14b) different from the position (recess 14c) in which the lid glass 15 is fixed, the lid glass 15 is not blocked from protruding from the sensor cover 14 toward the image pickup lens 1.

(Overhanging Part)

It should be noted here that as shown in (a) of FIG. 1, the base section 9 includes an overhanging part 9b overhanging in such a manner as to cover part of the lid glass 15. That is, with it being assumed that the direction from the image pickup element 12 toward the image pickup lens 1 is an upward direction, the base section 9 extends inward (toward the lid glass 15) from a higher position than the upper surface of the lid glass 15.

With this, at least part of the driving mechanism for driving the movable section 21 can be provided on the overhanging part 9b. In particular, it is preferable that as shown in (a) of FIG. 1, the base section 9 have a supporting part 9c so provided on the overhanging part 9b as to support a bottom surface of the movable section 21. This makes it possible to place the driving mechanism (e.g., the supporting part 9c) closer to the optical axis even if the protrusion of the lid glass 15 from the sensor cover 14 toward the image pickup lens 1 causes the fixing position of the fixed section 22 (position of the mounting surface 14b) to be shifted outward with respect to the optical axis. Therefore, as for the shapes, arrangement, etc. of the structures of the camera module, it is possible to achieve a configuration at the same level as that which is obtained in a case where the translucent member does protrude from the housing section toward the lens. For example, the supporting part 9c for supporting the movable section 21 can be provided close to the optical axis, the movable section 21 can be placed in a suitable position near the optical axis.

It should be noted that the supporting part 9c is a supporting part that limits the range of movement of the movable section 21 so as to prevent the movable section 21 from being driven beyond the normal range.

Further, the provision of the overhanging part 9b further complexifies the path of foreign bodies falling onto the upper surface of the sensor cover 14 first and then moving onto the lid glass 15, thus making it possible to more suitably prevent the foreign bodies from falling onto the lid glass 15.

It should be noted that as shown in (b) of FIG. 1, the overhanging part 9b may not cover the lid glass 15 when seen in a particular cross-section.

Further, it is preferable that as shown in (a) of FIG. 1, there exist a space between the lid glass 15 and the overhanging part 9b. With such a configuration, the lid glass 15 and the overhanging part 9b can be successfully prevented from making contact with each other during the step of assembling the camera module 51. With this, the center of the image pickup structure 16 including the sensor cover 14 on which the lid glass 15 has been fixed and the center of the optical structure 11 including the fixed section 22 having the overhanging part 9c can be successfully prevented from getting out of alignment due to contact between the lid glass 15 and the overhanging part 9b.

Figure 5:
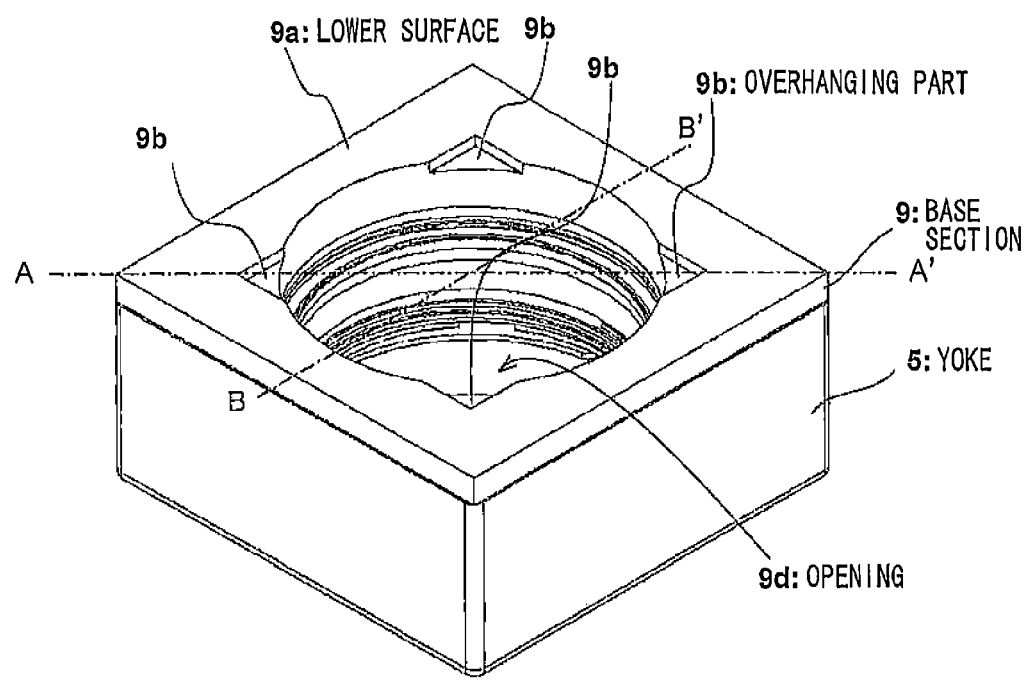
FIG. 5 is a perspective view schematically showing a configuration of an optical structure according to an embodiment of the present invention.

Furthermore, the shape of the overhanging part 9b is described in detail with reference to a drawing. FIG. 5 is a perspective view of the fixed section 22 as observed from the image pickup element 12. As shown in FIG. 5, the base section 9 has on its outer perimeter the lower surface 9a which is joined to the mounting surface 14b. Further, the base section 9 has an opening 9d, provided in a central part of the base section 9, through which light enters the image pickup element 12. Moreover, the overhanging part 9b includes a plurality of overhanging parts 9b provided in positions corresponding to the corners of the lid glass 15.

Thus, the overhanging part 9b may be that which covers only the corners of the lid glass 15. With such a configuration, light entering the image pickup element 12 is allowed to pass through the central part of the lid glass 15. That is, the path of light entering the image pickup element 12 can be suitably set.

It should be noted that depending on a relationship between the size of the opening 9d and the size of the lid glass 15, the overhanging part 9b may be designed to cover the entire perimeter (i.e., the corners and sides) of the lid glass 15.

Second Embodiment

Figure 2:
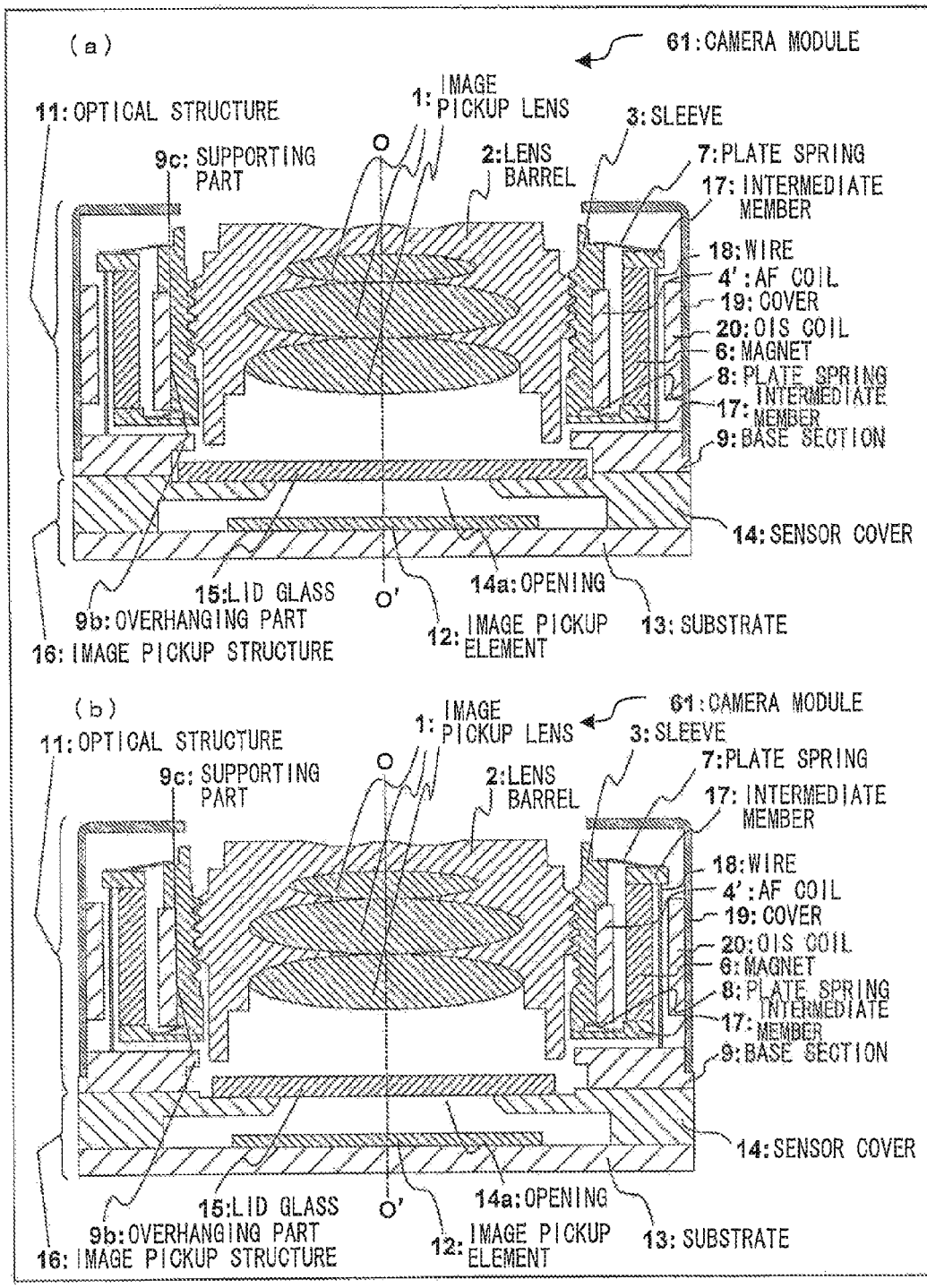
FIG. 2 is a cross-sectional view schematically showing a configuration of a camera module according to an embodiment of the present invention.
Figure 6:
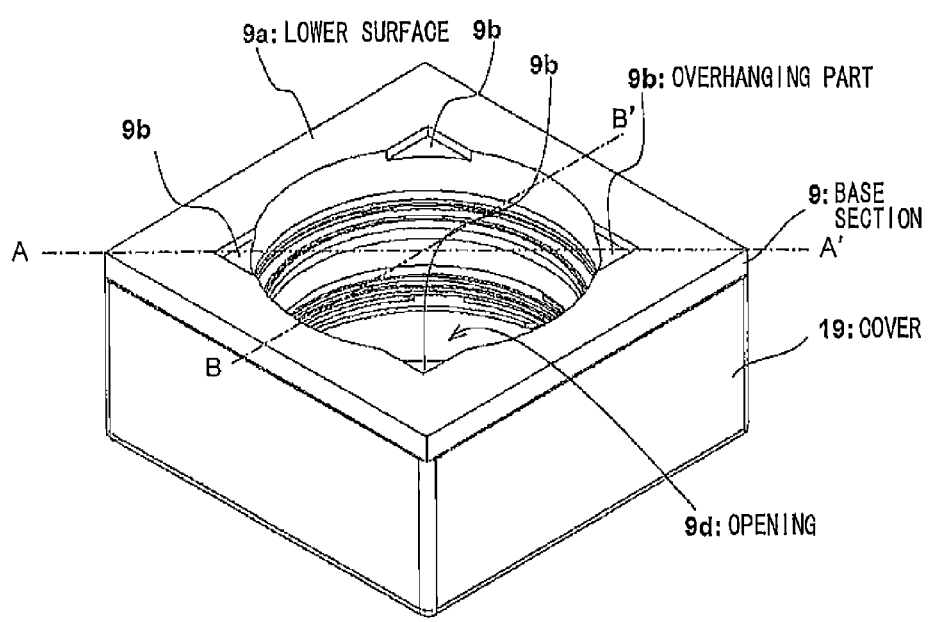
FIG. 6 is a perspective view schematically showing a configuration of an optical structure according to an embodiment of the present invention.
Figure 7:
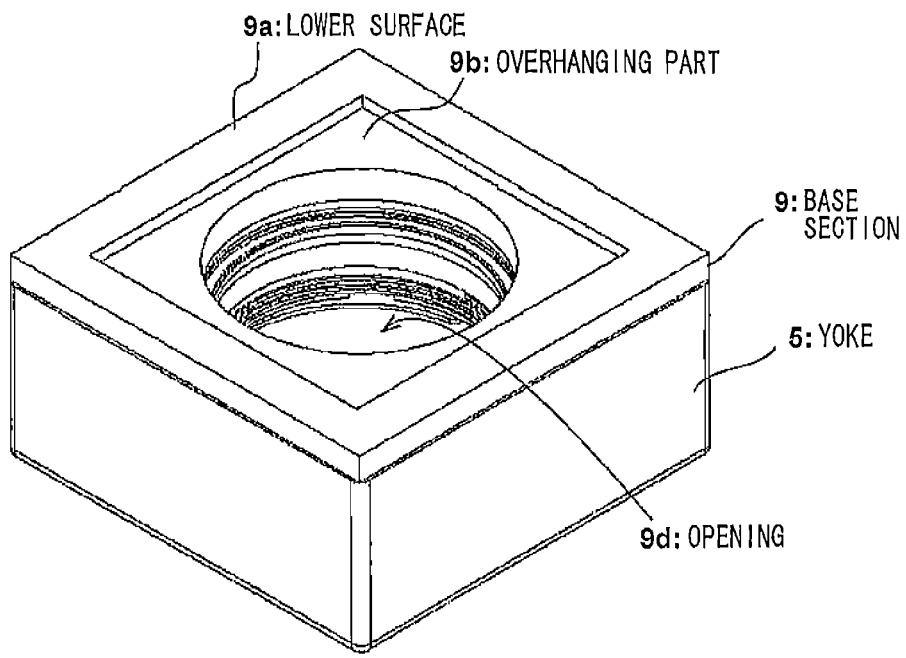
FIG. 7 is a perspective view schematically showing a configuration of an optical structure according to an embodiment of the present invention.
Figure 8:
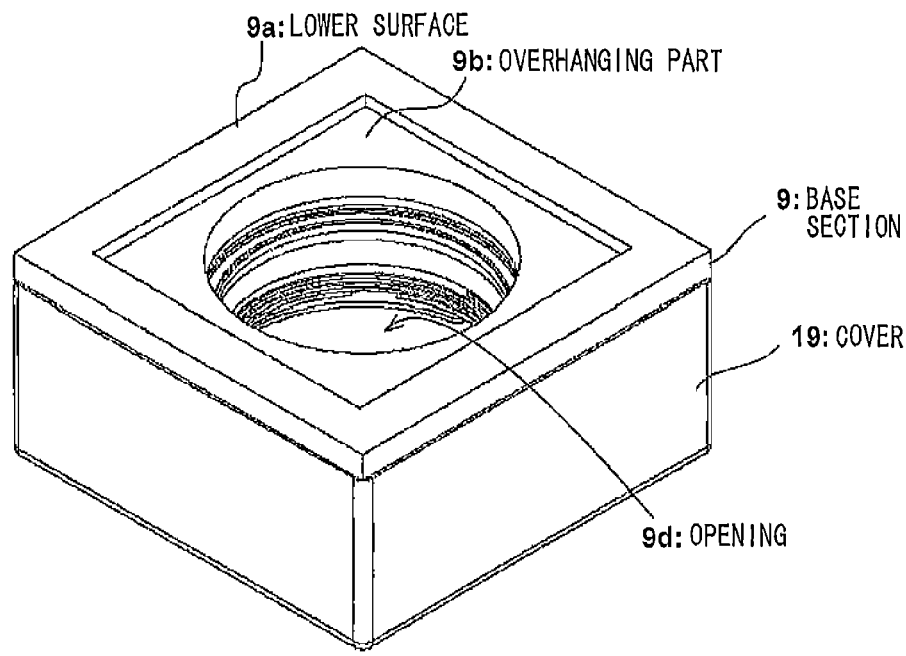
FIG. 8 is a perspective view schematically showing a configuration of an optical structure according to an embodiment of the present invention.

FIG. 2 is a set of cross-sectional views (a) and (b) schematically showing a configuration of a camera module 61 according to an embodiment (second embodiment) of the present invention. (a) of FIG. 2 is a cross-sectional view of the camera module 61 as taken along a diagonal line across a lid glass 15 to be described later (along the line A-A' of FIGS. 4 and 6), and (b) of FIG. 2 is a cross-sectional view of the camera module 61 as taken along a central line parallel to a side of the lid glass 15 (along the line B-B' of FIGS. 4 and 6). As shown in FIG. 2, the camera module 61 is composed of an optical structure 11 and an image pickup structure 16 joined on top of each other.

(Optical Structure)

In the present embodiment, the optical structure 11 includes an image pickup lens 1, a lens barrel 2, a sleeve 3, an AF coil 4', a magnet 6, plate springs 7 and 8, a base section 9, and an intermediate member 17, a wire 18, a cover 19, and an OIS coil 20.

The base section 9, fixed to the image pickup structure 16, supports the other components of the optical structure 11. The cover 19, provided as an outer part of the optical structure 11, is fixed to the base section 9.

Placed in a part surrounded by the cover 19 is the intermediate member 17, inside of which the sleeve 2 is placed. Placed inside of the sleeve 3 is the lens barrel 2, which holds the image pickup lens 1. In FIG. 2, the image pickup lens 1 has its optical axis represented by O-O'. The optical axis of the image pickup lens 1 is hereinafter referred to simply as "optical axis".

The sleeve 3 is connected to the intermediate member 17 via the plate springs 7 and 8 so as to be able to move along the optical axis. Further, the AF coil 4' is wound around the sleeve 3. Further, the magnet 6 is provided in the intermediate member 17 in such a manner as to face the AF coil 4'. The sleeve 3 can be driven along the optical axis by supplying an electric current to the AF coil 4'. That is, the camera module 61 allows the image pickup lens 1 to be driven along the optical axis, thereby achieving an autofocus function, for example.

Further, the intermediate member 17 is supported by the base section 9 via the wire 18 extending along the optical axis. The wire 18 has one end fixed to the base section 9, with the other end of the wire 18 being fixed to the intermediate member 17. The wire 18 is also referred to as "suspension wire", and the intermediate member 17 can move in a direction perpendicular to the optical axis as the wire 18 slightly bends.

It should be noted here that the OIS coil 20 is provided on the inner side of the cover 19 in such a manner as to face the magnet 6 provided in the intermediate member 17. The intermediate member 17 can be driven in a direction perpendicular to the optical axis by supplying an electric current to the OIS coil 20. That is, the camera module 61 allows the image pickup lens 1 to be driven in a direction perpendicular to the optical axis, thereby achieving an image stabilization function, for example.

In the present embodiment, those components of the optical structure 11 which are designed to be driven along the optical axis, i.e., the image pickup lens 1, the lens barrel 2, the sleeve 3, and the AF coil 4', the plate spring 7 and 8, the magnet 6, and the intermediate member 17 are referred to as "movable section 21", and those components of the optical structure 11 which are fixed to the image pickup structure 16 to drive the movable section 21, i.e., the base section 9, the cover 19, the wire 18, and the OIS coil 20 are referred to as "fixed section 22".

(Image Pickup Structure)

In the present embodiment, the image pickup structure 16 includes an image pickup element 12, a substrate 13, a sensor cover 14, and a lid glass 15.

The image pickup element 12 is provided on the substrate 13. Further, the sensor cover 14, fixed on the substrate 13, houses the image pickup element 12. The sensor cover 14 is provided with an opening 14a through which light having entered through the image pickup lens 1 passes. Moreover, the lid glass 15 is fixed on the sensor cover 14 in such a manner as to close the opening 14a. Further, the sensor cover 14 has a mounting surface 14b as an upper surface thereof. The mounting surface 14b is a region different from the region in which the lid glass 15 is fixed. The base section 9 (or rather, a lower surface 9b of the base section 9) of the optical structure 11 is fixed on the mounting surface 14b.

In the present embodiment, as in the first embodiment, the sensor cover 14 may include such a recess 14c as that shown in FIGS. 3 and 4 so that the lid glass 15 is fixed in the recess 14c. Alternatively, the lid glass 15 may be fixed in a predetermined region on the sensor cover 14 without providing a recess 14c.

In either case, the lid glass 15 protrudes from the cover sensor 14 toward the image pickup lens 1 in the present embodiment, as in the first embodiment. This allows the present embodiment to suitably bring about an effect of curbing the influence of foreign bodies, etc. as explained in the first embodiment.

(Overhanging Part)

It should be noted here that as shown in (a) of FIG. 2, the base section 9 includes an overhanging part 9b overhanging in such a manner as to cover part of the lid glass 15, as in the first embodiment. This brings about the same effects as those which are brought about by the first embodiment. It should be noted that in the present embodiment, the movable section 21 is driven in a direction perpendicular to the optical axis. However, the movable section 21 may move along the optical axis when an impact or the like is applied to the camera module 61. This may results in damage to the wire 18 and the like. It should be noted here that by providing a supporting part 9c on the overhanging part 9b to support a bottom surface of the movable section 21, the range of movement of the movable section 21 along the optical axis as shown in (a) of FIG. 2 is limited, so that the wire 18 and the like can be prevented from being damaged as mentioned above.

Further, in the present embodiment, too, as shown in (b) of FIG. 2, the overhanging part 9b may not cover the lid glass 15 when seen in a particular cross-section.

Further, for driving the image pickup lens 1 also in a direction perpendicular to the optical axis, the present embodiment has a larger internal space. This makes it more likely for foreign bodies to get inside the camera module 61 from above. However, the present embodiment can curb the influence of foreign bodies as in the first embodiment, and can therefore suitably prevent the occurrence of such a problem.

(Summary)

As described above, a camera module according to the present invention includes: a lens; an image pickup element; a housing section which has an opening facing the lens and which houses the image pickup element; a translucent member, fixed on the housing section, which closes the opening; a movable section which holds the lens; and a fixed section, fixed in a different position on the housing section from the translucent member, which drives the movable section, the translucent member protruding from the housing section toward the lens, the fixed section having an overhanging part overhanging in such a manner as to cover part of the translucent member.

According to the foregoing configuration, the translucent member protrudes from the housing section toward the lens. With this, the image pickup element can be kept at a distance from foreign bodies, if any, having got fallen onto the translucent member. Therefore, the influence on light reaching the image pickup element can be reduced with respect to the size of foreign bodies, so that the influence of foreign bodies can be curbed.

Further, foreign bodies are forced to follow a complex path by falling onto the surface of the housing section first and then moving onto the translucent member. Since the translucent member protrudes from the housing section and, furthermore, part of the translucent member is covered by the overhanging part, the path is complexified. This makes it possible to suitably prevent the foreign bodies from falling onto the translucent member. Therefore, the influence of the foreign bodies can be curbed.

Further, according to the foregoing configuration, the fixed section is fixed in a different position on the housing section from the translucent member. The translucent member can be successfully made to protrude from the housing section toward the lens.

Further, according to the foregoing configuration, at least part of the driving mechanism for driving the movable section can be provided on the overhanging part. This makes it possible to place the driving mechanism closer to the optical axis even if the protrusion of the translucent member from the housing section toward the lens causes the fixing position of the fixed section to be shifted outward with respect to the optical axis. Therefore, as for the shapes, arrangement, etc. of the structures of the camera module, it is possible to achieve a configuration at the same level as or a higher level than that which is obtained in a case where the translucent member does protrude from the housing section toward the lens. Further, since the housing section is more depressed than the translucent member, it is also possible to secure space for the driving mechanism and increase driving thrust as needed.

As described above, the foregoing configuration makes it possible to provide a high-quality camera module with limited influence of foreign bodies having got inside it.

The camera module according to the present invention is preferably configured such that the fixed section has a movable-section supporting part so provided on the overhanging part as to support the movable section.

According to the foregoing configuration, the movable-section supporting part to support the movable section can be provided on the overhanging part. This makes it possible to place the movable-section supporting part closer to the optical axis even if the protrusion of the translucent member from the housing section toward the lens causes the fixing position of the fixed section to be shifted outward with respect to the optical axis. Therefore, as for the shapes, arrangement, etc. of the structures of the camera module, it is possible to achieve a configuration at the same level as or a higher level than that which is obtained in a case where the translucent member does protrude from the housing section toward the lens.

The camera module according to the present invention may be configured such that: the translucent has a rectangular shape; and the overhanging part covers at least corners of the translucent member.

According to the foregoing configuration, the overhanging part covers the corners of the translucent member having a rectangular shape. Light entering the image pickup element is allowed to pass through the central part of the translucent member. That is, the optical path of light entering the image pickup element can be suitably set.

It is preferable that the camera module according to the present invention have a space provided between the overhanging part and the translucent member.

According to the foregoing configuration, the translucent member and the overhanging part can be successfully prevented from making contact with each other during the step of assembling the camera module. With this, the center of the image pickup structure including the housing section on which the translucent member has been fixed and the center of the optical structure including the fixed section having the overhanging part can be successfully prevented from getting out of alignment due to contact between the translucent member and the overhanging part.

The camera module according to the present invention may be configured such that the fixed section drives the movable section along an optical axis of the lens.

The foregoing configuration allows the lens to be driven along the optical axis, thereby achieving an autofocus function, for example. Moreover, according to the present invention, the presence of the overhanging part provided in the fixed section makes it possible to suitably place the driving mechanism for driving the movable section.

The camera module according to the present invention may be configured such that: the fixed section drives the movable section in a direction perpendicular to an optical axis of the lens; and the movable part drives the lens along the optical axis of the lens.

The foregoing configuration allows the lens to be driven along the optical axis and in a direction perpendicular to the optical axis, thereby achieving an autofocus function, an image stabilization function, etc., for example. Moreover, according to the present invention, the presence of the overhanging part provided in the fixed section makes it possible to suitably place the driving mechanism for driving the movable section.

The camera module according to the present invention may be configured such that the housing section is provided with a recess surrounding the opening, the recess being wider than a size of the translucent member and shallower than a thickness of the translucent member.

According to the foregoing configuration, since the width of the recess is greater than the size of the translucent member, the translucent member can be successfully fitted in the recess. Further, since the depth of the recess is less than the thickness of the translucent member, the translucent member can be successfully made to protrude from the housing section toward the lens.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can be applied to the field of manufacture of electronic devices (e.g., cellular phones) having a function of taking images or video pictures or of components that constitute such electronic devices.

REFERENCE SIGNS LIST 51, 61 Camera module
1 Image pickup lens (lens)
2 Lens barrel
3 Sleeve
4 Coil
4' AF coil
5 Yoke
6 Magnet
7, 8 Plate spring
9 Base section
9a Lower surface
9b Overhanging part
9c Supporting part (movable section supporting part)
9d Opening
9d Top cover
11 Optical structure
12 Image pickup element
13 Substrate
14 Sensor cover (housing section)
14a Opening
14b Mounting surface
14c Recess
15 Lid glass (translucent member)
16 Image pickup structure
17 Intermediate member
18 Wire
19 Cover
20 OIS coil
21 Movable section
22 Fixed section
O-O' Optical axis

The invention claimed is:

1. A camera module comprising:
a lens;
an image pickup element;
a housing section which has an opening facing the lens and which houses the image pickup element;
a translucent member, fixed on the housing section, which closes the opening;
a movable section which holds the lens; and
a fixed section, fixed in a different position on the housing section from the translucent member, which drives the movable section,
the translucent member protruding from the housing section toward the lens,
the translucent member having an upper surface that is closer to the lens than a mounting surface on the housing section on which the fixed section is fixed,
the fixed section having an overhanging part overhanging in such a manner as to cover part of the translucent member,
the camera module having a space provided between the overhanging part and the translucent member,
the movable section including a lens barrel,
the lens barrel being provided inside the overhanging part such that a space is provided between the lens barrel and the overhanging part.

2. The camera module as set forth in claim 1, wherein the fixed section has a movable-section supporting part provided on the overhanging part so as to support the movable section.

3. The camera module as set forth in claim 1, wherein:
the translucent member has a rectangular shape; and
the overhanging part covers at least corners of the translucent member.

4. The camera module as set forth in claim 1, wherein the fixed section drives the movable section along an optical axis of the lens.

5. The camera module as set forth in claim 1, wherein:
the fixed section drives the movable section in a direction perpendicular to an optical axis of the lens; and
the movable part drives the lens along the optical axis of the lens.

6. The camera module as set forth in claim 1, wherein the housing section is provided with a recess surrounding the opening, the recess being wider than a size of the translucent member and shallower than a thickness of the translucent member.

* * * * *